US010487865B2

(12) United States Patent
    Daly (10) Patent No.: US 10,487,865 B2
(45) Date of Patent: Nov. 26, 2019

(54) TOGGLE FIXING

(71) Applicant: fischerwerke GmbH & Co. KG, Waldachtal (DE)

(72) Inventor: Aaron Daly, Pfalzgrafenweiler (DE)

(73) Assignee: fischerwerke GmbH & Co. KG, Waldachtal (DE)

( * ) Notice: Subject to any disclaimer, the term of this patent is extended or adjusted under 35 U.S.C. 154(b) by 134 days.

(21) Appl. No.: 15/520,641

(22) PCT Filed: Oct. 6, 2015

(86) PCT No.: PCT/EP2015/001956
 § 371 (c)(1),
 (2) Date: Apr. 20, 2017

(87) PCT Pub. No.: WO2016/062373
 PCT Pub. Date: Apr. 28, 2016

(65) Prior Publication Data
 US 2017/0307000 A1    Oct. 26, 2017

(30) Foreign Application Priority Data

Oct. 24, 2014  (DE) .................. 10 2014 015 685
Aug. 13, 2015  (DE) .................. 10 2015 113 332

(51) Int. Cl.
 *F16B 13/08*  (2006.01)
 *F16B 13/12*  (2006.01)

(52) U.S. Cl.
 CPC ........ *F16B 13/0808* (2013.01); *F16B 13/124* (2013.01)

(58) Field of Classification Search
 CPC .................................................. F16B 13/0808
 (Continued)

(56) References Cited

U.S. PATENT DOCUMENTS 965,845  A  *  7/1910  Ellis ................... F16B 13/0808
                                                411/344
1,521,024 A  *  12/1924  Hubener ............. F16B 13/0808
                                                411/344
(Continued)

FOREIGN PATENT DOCUMENTS

CA    2 502 044 A1    9/2006
DE    1 121 792 B    1/1962
(Continued)

OTHER PUBLICATIONS

International Search Report and Written Opinion for corresponding International Application No. PCT/EP2015/001956 dated Dec. 16, 2015.
(Continued)

*Primary Examiner* — Flemming Saether
(74) *Attorney, Agent, or Firm* — Renner, Otto, Boisselle & Sklar, LLP (57) ABSTRACT

The invention relates to a toggle fixing for fixing an article to a thin-walled building component, having a crosspiece, which has an opening for receiving a screw, and having a strip which is connected to the crosspiece and serves for holding and positioning the crosspiece during mounting. In order also to be able to use such a fixing in a solid building material, the invention proposes that the crosspiece have a screw channel parallel to the crosspiece longitudinal axis ($L_1$).

20 Claims, 6 Drawing Sheets

(58) Field of Classification Search
USPC .................................. 411/340, 344, 345, 346
See application file for complete search history.

(56) References Cited

U.S. PATENT DOCUMENTS

| | | | |
|---|---|---|---|
| 3,211,042 A | 10/1965 | Fischer | |
| 4,075,924 A | 2/1978 | McSherry et al. | |
| 4,183,386 A * | 1/1980 | Brown | F16B 13/0808 411/176 |
| 4,449,873 A * | 5/1984 | Barth | F16B 13/0808 411/341 |
| 5,221,169 A * | 6/1993 | McSherry | F16B 13/0808 411/342 |
| 5,322,401 A * | 6/1994 | Vernet | B29C 45/0017 264/328.8 |
| 6,435,789 B2 * | 8/2002 | Gaudron | F16B 13/002 411/29 |
| 6,679,664 B2 * | 1/2004 | Ikuta | F16B 13/0808 411/346 |
| 2009/0169331 A1 | 7/2009 | Pilon | |
| 2009/0208310 A1 | 8/2009 | Ikuta | |
| 2012/0045292 A1 | 2/2012 | Kaye | |
| 2012/0328392 A1 * | 12/2012 | Difante | F16B 13/0808 411/342 |
| 2014/0102040 A1 * | 4/2014 | Crook | F16B 13/0808 52/745.21 |

FOREIGN PATENT DOCUMENTS

| | | |
|---|---|---|
| DE | 27 21 768 A1 | 12/1977 |
| DE | 30 08 796 A1 | 9/1981 |
| DE | 296 18 192 U1 | 2/1997 |
| DE | 10 2009 006 542 A1 | 8/2009 |
| EP | 0 837 254 A1 | 4/1998 |
| EP | 1 861 626 B1 | 10/2014 |
| WO | WO 2004/079209 A1 | 9/2004 |

OTHER PUBLICATIONS

International Preliminary Report on Patentability for corresponding International Application No. PCT/EP2015/001956 dated Apr. 25, 2017 and English translation.

* cited by examiner

TOGGLE FIXING

TECHNICAL FIELD OF INVENTION

The invention relates to a toggle fixing having the features described herein.

DISCUSSION OF RELATED ART

Specification DE 1 121 792 discloses a toggle fixing which is suitable for fixing an article, for example a lamp, to a thin-walled building component, for example a plasterboard panel to a ceiling. For that purpose the toggle fixing has a crosspiece through which a threaded bore extends transversely. In addition, an integrally formed strip projects laterally in the region of the threaded bore. Once a hole has been drilled in the thin-walled building component, the toggle fixing is pushed, one end first, through the hole, the strip being bent to the side in such a way that it rests laterally against the crosspiece. As soon as the crosspiece has passed fully through the hole, it can be tilted so that a supporting side comes into contact with the rear side of the building component. The tilting movement is effected by pulling the strip. At the same time, it is ensured that the threaded bore is in alignment with the hole, so that a screw can be screwed in. Such a screw can be used to fix the article to the front side facing towards the user. Should the user, on drilling the hole, unexpectedly not reach a cavity behind the thin-walled building component, for example because there is a lath as substructure in that region, the known toggle fixing cannot be used.

SUMMARY OF THE INVENTION

The problem of the invention is to provide a toggle fixing which can also be used when there is no cavity behind the thin-walled building component as fixing substrate.

That problem is solved according to the invention by the features described herein. The toggle fixing according to the invention for fixing an article to a thin-walled building component has a crosspiece which extends along a crosspiece longitudinal axis and has an opening for receiving a screw. The opening can be a threaded bore, but does not need to have a thread or be cylindrical, especially if a screw is to be screwed self-tappingly into the opening. In order to be able to receive a self-tapping screw satisfactorily, the opening can have ribs running along the longitudinal axis of the opening. The opening is especially a through-hole, but can also be in the form of a blind hole, for example having an easily penetrable residual wall. An opening longitudinal axis runs transversely with respect to the crosspiece longitudinal axis, so that when the crosspiece is in a tilted position a screw can be screwed transversely through the crosspiece. A strip is connected to the crosspiece, which strip serves for holding and positioning the crosspiece during mounting. The connection between the crosspiece and the strip can be integral, but, for example, a clip connection is also possible. The connection is especially in the form of a pivot bearing, so that the strip can be pivoted with respect to the crosspiece. On the side facing towards the strip, the crosspiece forms a supporting side.

According to the invention, the crosspiece of the toggle fixing has a screw channel which extends along a channel longitudinal axis which is substantially parallel to the crosspiece longitudinal axis. As a result, the toggle fixing can also be used, for example, when unexpectedly there is not a cavity but a lath behind the thin-walled building component. In that case the hole can be drilled into the lath and the toggle fixing inserted into the hole. A "hole" herein always means the hole which is drilled into the thin-walled building component for fixing purposes and through which the crosspiece is pushed for fixing purposes. If there is no cavity behind the thin-walled building component, the toggle fixing is not tilted but remains in the hole and a screw can be driven, that is to say especially screwed, into the screw channel to fix an article. Even without deformation, the crosspiece is able to find purchase in a narrow hole by simple friction. The screw channel and the screw, however, are especially configured in such a way that driving the screw into the screw channel results in expansion of the crosspiece. "Expansion" means, especially, widening perpendicular to the longitudinal axis of the crosspiece. In this case the toggle fixing therefore functions not by tilting but, similarly to an expansible fixing plug, by expansion. The expansion takes place especially either parallel to the longitudinal axis of the opening or perpendicularly thereto or in both directions.

The screw channel does not need to extend over the entire length of the crosspiece, but preferably extends over at least a fifth, especially at least a third, of the longitudinal extent of the crosspiece, so that a self-tapping screw finds sufficient purchase, and preferably over the entire length of the crosspiece, so that longer screws can also easily be screwed in completely.

Preferably the screw channel narrows in one direction, that direction being the driving-in direction of the screw. The screw is thus easily insertable and is initially centred with a small turning moment. When the screw penetrates into the narrower portion of the screw channel, it ensures a high degree of expansion therein.

The expansion is, moreover, preferably facilitated by the crosspiece having a slot which runs substantially parallel to the crosspiece longitudinal axis. If the screw channel is relatively narrow in relation to the screw and the slot is arranged so that the crosspiece expands easily and widely at the start of the driving-in of the screw into the screw channel, the toggle fixing is also prevented from co-rotation in the hole, because the expanded crosspiece forms an anti-rotation lock.

Preferably the crosspiece consists of at least two components. The two components are especially to be understood as being two different components and/or materials. However, the two components can also be, for example, two identical materials which are simply separated by a phase boundary, such as can be created by two-component injection moulding. By the use of two components the crosspiece can be adapted in respect of the transmission of the load from a screw that is screwed into the crosspiece to the thin-walled building component in question. For example, particularly regions which are to be of especially rigid construction in order to distribute the load within the crosspiece can be formed by a first component having an advantageous combination of cross-section and choice of material, while regions which serve for direct transmission to the thin-walled building component are of particularly resilient and/or planar construction in order to avoid stress peaks in the region of the surface of the thin-walled building component.

Preferably a first component of the crosspiece forms a supporting body and a second component forms a contact body. As a result, the first component, in respect of its geometry and in respect of its material, can be geared towards as high a rigidity as possible. The supporting body extends especially over at least half the length of the crosspiece, preferably over at least 75 percent of the length, in order to distribute the load within the crosspiece. The contact body is arranged in the region of the supporting side and serves for planar contact with the thin-walled building component, there being intended especially contact with a rear side of the thin-walled building component remote from the user. The contact body can thus be configured in such a way in respect of its shape and material that the best possible distribution of the effective forces is obtained, while stress peaks are avoided.

In a preferred embodiment, the first component forming the supporting body is harder than the second component forming the contact body. The choice of such materials is advantageous for fulfilling the relevant functions; in addition to the choice of material, the geometric shape, in particular, makes a contribution thereto. The supporting body is especially made of steel or of a glass-fibre-reinforced plastics material having a fibre content of at least 15 percent by weight, especially at least 30 percent by weight and preferably at least 50 percent by weight.

In a preferred embodiment, the screw channel is formed at least partly by the contact body. Especially if the screw results in expansion of the crosspiece and if the contact body, by virtue of the choice of material and/or geometry, is more readily deformable than the supporting body, this has the result that the contact body makes especially good contact with the wall of the hole. This results in especially good purchase in the hole.

Preferably the screw channel is arranged between the contact body and the supporting body. Accordingly, the crosspiece can easily be expanded at the boundary between the contact body and the supporting body, that is to say, in particular, the contact body and the supporting body can be moved in opposite directions, without the need for deformation within the contact body or the supporting body. The toggle fixing can accordingly be expanded satisfactorily with a relatively small turning moment.

The contact body, preferably at least in the two outer thirds of the longitudinal extent of the crosspiece, projects beyond the supporting body on the supporting side in the direction of the opening longitudinal axis. As a result, when the crosspiece is resting on the rear side of the thin-walled building component, the planar contact body makes contact therewith at the location where the load is transmitted from the crosspiece to the thin-walled building component, that is to say preferably at the two ends of the crosspiece and to a lesser extent in the centre of the crosspiece.

The contact body preferably consists of at least two parts, especially of two halves. Firstly this makes it possible to achieve movability within the contact body and accordingly expansibility. Secondly, in the case of a supporting body having a U-shaped cross-section, one part, or one half, can be assigned to each limb of the supporting body, it being necessary to use only a small amount of material. A supporting body having, at least in some regions, a U-shaped cross-section has proved to be particularly rigid. Especially if the supporting body is made of metal, it can be produced especially simply in the form of a bent component having a U-shaped cross-section. "Halves" means herein an approximately but not absolutely exact division in half of volume and/or weight. The halves are especially substantially mirror-symmetrical.

Preferably the two parts, especially halves, of the contact body are movable relative to one another in a direction transverse with respect to the crosspiece longitudinal axis, especially in such a way that the crosspiece can be made smaller in a dimension transverse with respect to the crosspiece longitudinal axis. The contact body can accordingly be shaped in such a way that it is narrow when pushed through the hole, while after tilting by movement of the two halves apart from one another it can distribute the load over a large surface area. The moving-apart from one another is preferably effected by a resilient element which connects the two parts to one another, especially integrally. Alternatively, the screwing-in of the screw into the opening could bring about the movement. The movability of the two parts also has the advantage that they can easily be expanded by driving in a screw in the longitudinal direction of the crosspiece, that is to say parallel to the longitudinal axis of the crosspiece. As a result, the toggle fixing can also be used, for example, when there is unexpectedly not a cavity but, for example, a lath behind the thin-walled building component. In that case the hole can be drilled into the lath and the toggle fixing inserted into the hole, during which, especially, the two halves are pressed together. By driving in a screw to fix the article, the two parts of the contact body are then expanded and the toggle fixing is expanded. In this case the toggle fixing therefore functions not by tilting but, similarly to an expansible fixing plug, by expansion.

Preferably at least one end of the crosspiece has an insertion slope. This facilitates insertion into the hole. Particularly when, to pass through the hole, the crosspiece has to be compressed slightly transversely with respect to the longitudinal axis of the crosspiece, as can be the case with a contact body having two halves, the insertion slope serves for easier insertion.

BRIEF DESCRIPTION OF THE DRAWINGS

The invention is explained below with reference to two exemplary embodiments.

DETAILED DESCRIPTION OF THE INVENTION

The toggle fixing 1 of the first exemplary embodiment, shown in FIGS. 1 to 7, has an elongate crosspiece 2 which extends approximately parallelepipedally along a crosspiece longitudinal axis $L_1$. A strip 3 projects towards the bottom approximately centrally in respect of the longitudinal extent.

Figure 1:
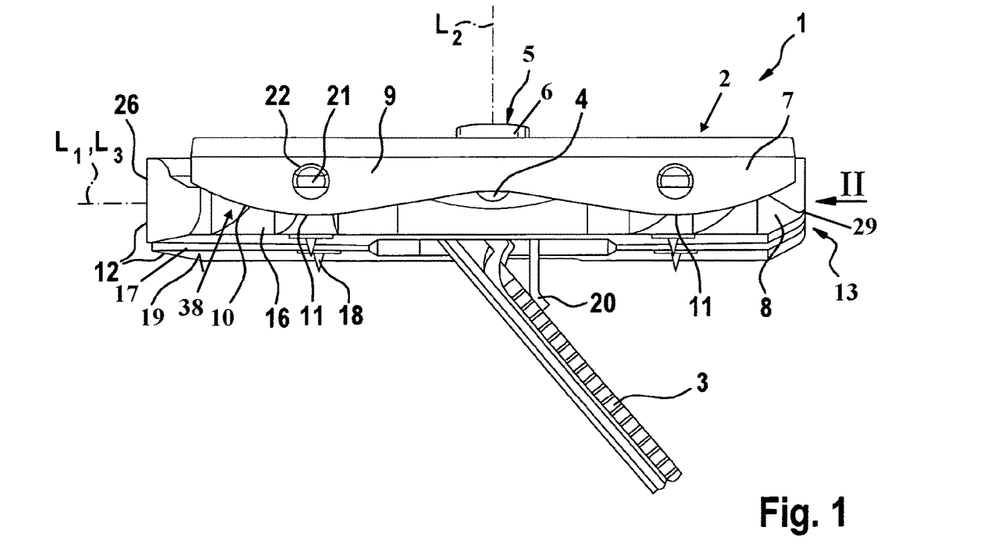
FIG. 1 shows a first exemplary embodiment in a perspective view from the side.
Figure 6:
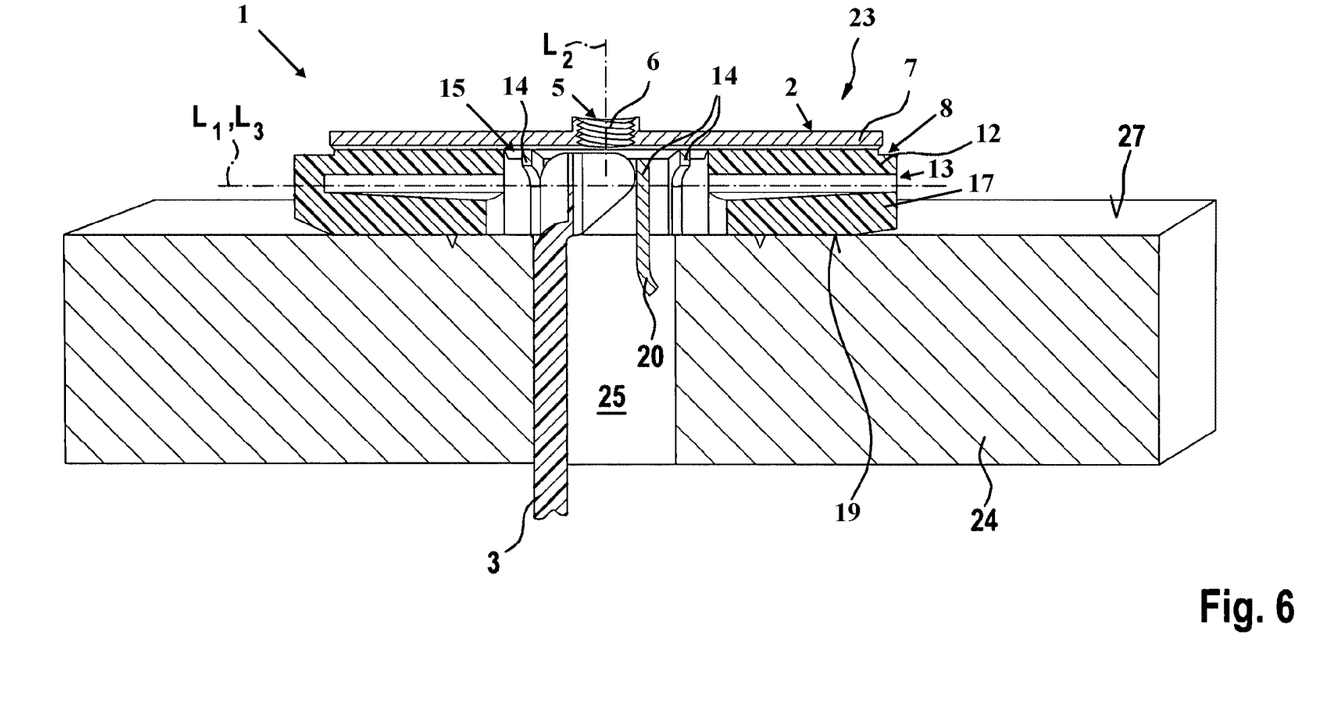
FIG. 6 shows the first exemplary embodiment during mounting on a thin-walled building component in a perspective sectional view.

Herein "bottom" always refers to the direction perpendicular to the crosspiece longitudinal axis $L_1$ in which the strip 3 projects. This corresponds, for example, to the installed position when fixed to a ceiling. "Top" accordingly denotes the opposite side. The dimension from the bottom to the top is referred to as "height", while the dimension transverse thereto is referred to as "width" and the direction as "lateral". The strip 3 is an elongated body made of plastics material, the geometric details of which are not important in connection with the invention. The strip 3 is pivotally mounted by means of two bearing pins 4 centrally in the crosspiece 2, the strip 3 being mounted in such a way that it is movable back and forth between a position in which it is substantially parallel to the crosspiece longitudinal axis $L_1$ and a position in which, as shown in FIG. 6, it is perpendicular to the crosspiece longitudinal axis $L_1$. FIG. 1 shows an intermediate position. In order to differentiate between the two ends of the crosspiece 2 hereinbelow, "rear" denotes the end towards which the strip 3 is pivotable. Accordingly, "front" means the other end of the crosspiece 2. In the region of the connection between the strip 3 and the crosspiece 2, the crosspiece 2 has an opening 5 for receiving a screw (not shown) (see FIG. 6). The opening 5 is in the form of a threaded through-hole 6. The opening 5 extends along an opening longitudinal axis $L_2$ which runs from bottom to top perpendicularly to the crosspiece longitudinal axis $L_1$.

Figure 2:
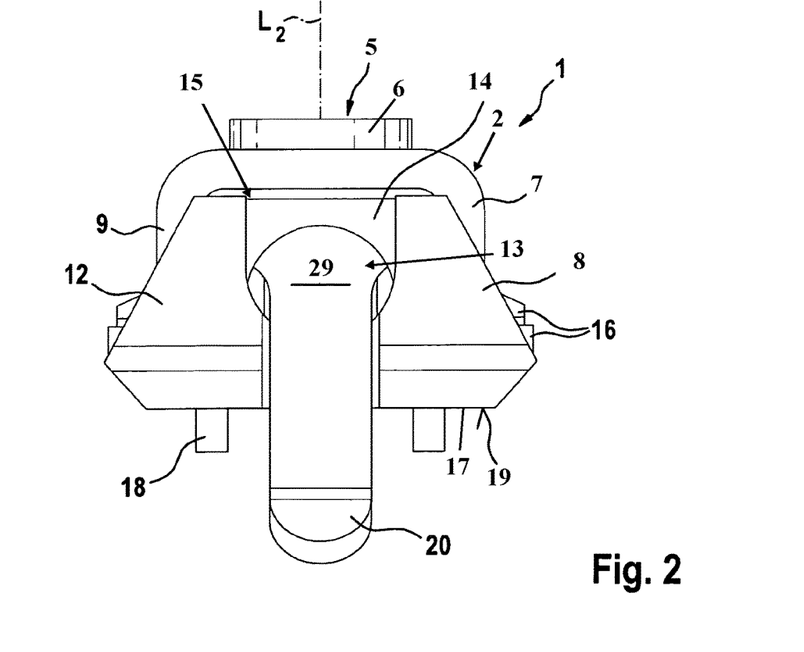
FIG. 2 shows the same exemplary embodiment, without the strip, in a side view in accordance with arrow II in FIG. 1.
Figure 3:
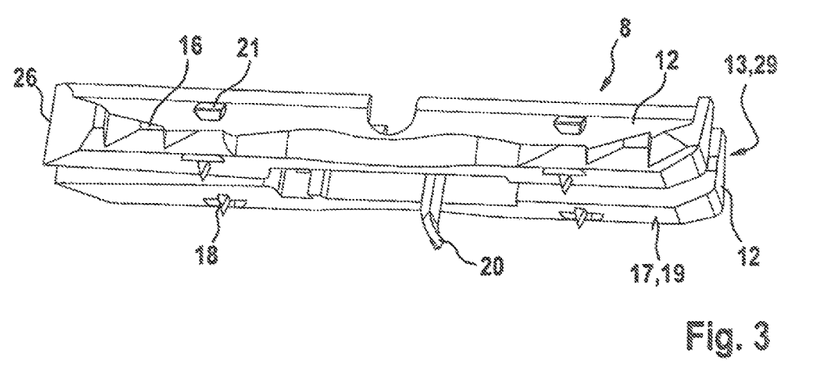
FIG. 3 shows the contact body of the first exemplary embodiment in a perspective view.
Figure 4:
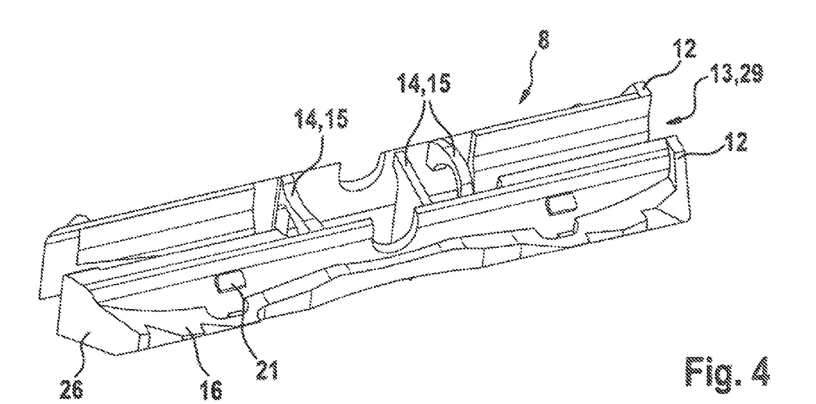
FIG. 4 shows the same contact body in a further perspective view.
Figure 5:
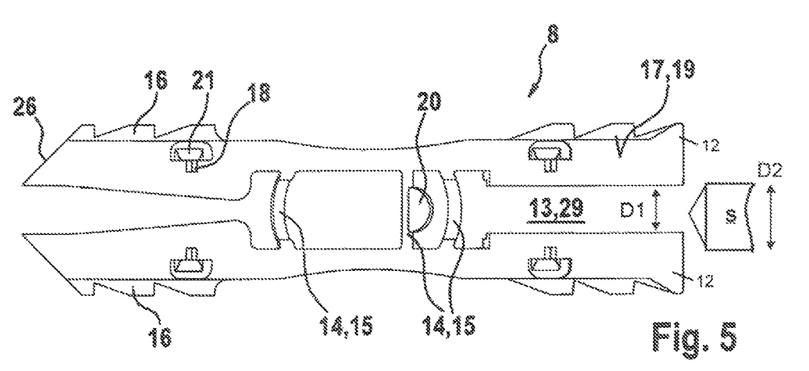
FIG. 5 shows the same contact body in a plan view from below.

The crosspiece 2 consists of two components, namely a supporting body 7 as first component made of steel and a contact body 8 as second component made of plastics material. The first component is therefore harder than the second component. The supporting body 7 has a substantially U-shaped cross-section, the two limbs 9 pointing towards the bottom. The supporting body 7 extends over almost the entire length of the crosspiece 2 with a constant width, whereas its height varies slightly over the length of the crosspiece because the limbs 9 form, at the bottom, an undulating supporting edge 10 having two downwardly projecting bulges 11. The contact body 8 consists essentially of two halves 12 which extend mirror-symmetrically over the entire length of the crosspiece 2 and are each approximately L-shaped in cross-section. The halves 12 rest closely against the inner side of the supporting body 7 and, at the bottom, against the supporting edges 10. A screw channel 13 of approximately rectangular cross-section extends between the halves 12, which screw channel is open towards the bottom and is bounded by the supporting body 7 at the top, the screw channel 13 being slightly narrowed in the lower half. FIGS. 4 and 5, which show the contact body 8 obliquely from above and from below, illustrate the course of the screw channel 13 from the rear to the front. The screw channel 13 first runs with a constant cross-section and then, in the middle third, opens to approximately double the width. The screw channel 13 then narrows considerably stepwise, only the lower region of the channel being narrower relative to the rear third, while the upper region has the same width. Thereafter, that is to say in the front third, the cross-section of the screw channel 13 opens again to the same cross-section as in the rear third. The screw channel 13 therefore narrows both from front to back and vice versa. In the middle third, the two halves 12 are integrally connected at the top by three thin, arcuate resilient bridges 14. The resilient bridges 14 form resilient elements 15 which allow the halves 12 to be movable towards one another, that is to say in a direction transverse with respect to the crosspiece longitudinal axis $L_1$. In the front and rear thirds the halves 12 each have three teeth 16 at the sides. At least one of the resilient elements 15 is arranged at an axial end of the screw channel 13 as shown in FIG. 4. At the bottom the halves 12 form a bearing surface 17 which lies substantially in one plane. Four small points 18 project beyond that plane towards the bottom. The bearing surface 17 forms a supporting side 19 of the crosspiece 2, because it is intended to transmit a load to a substrate. Since the contact body 8 also adjoins the supporting edges 10 of the limbs 9 of the supporting body 7 at the bottom, the contact body 8 projects beyond the supporting body 7 on the supporting side 19. In addition, as shown in FIG. 2, the contact body 8 projects laterally beyond the supporting body 7, that is to say in a direction transverse with respect to the opening longitudinal axis $L_2$ and transverse with respect to the crosspiece longitudinal axis $L_1$.

In the region of the opening 5, a resilient tongue 20 is formed integrally with one of the resilient bridges 14, which resilient tongue projects beyond the points 18 towards the bottom. The resilient tongue 20, as shown in FIG. 1, rests against the strip 3 when the latter is parallel or inclined with respect to the crosspiece 2. The resilient tongue 20 accordingly effects movement of the strip 3 in the direction of a perpendicular position of the strip 3 with respect to the crosspiece 2, as shown in FIG. 6.

The contact body 8 is fixed on the supporting body 7 by two locking lugs 21 on each half 12. For that purpose the supporting body 7 has circular apertures 22 in the limbs 9 in which the locking lugs 21 engage.

It is also possible arrange a displaceable sleeve (not shown) on the strip 3, as known from the prior art. Since such a sleeve is not essential for the invention, it is not described herein.

Figure 7:
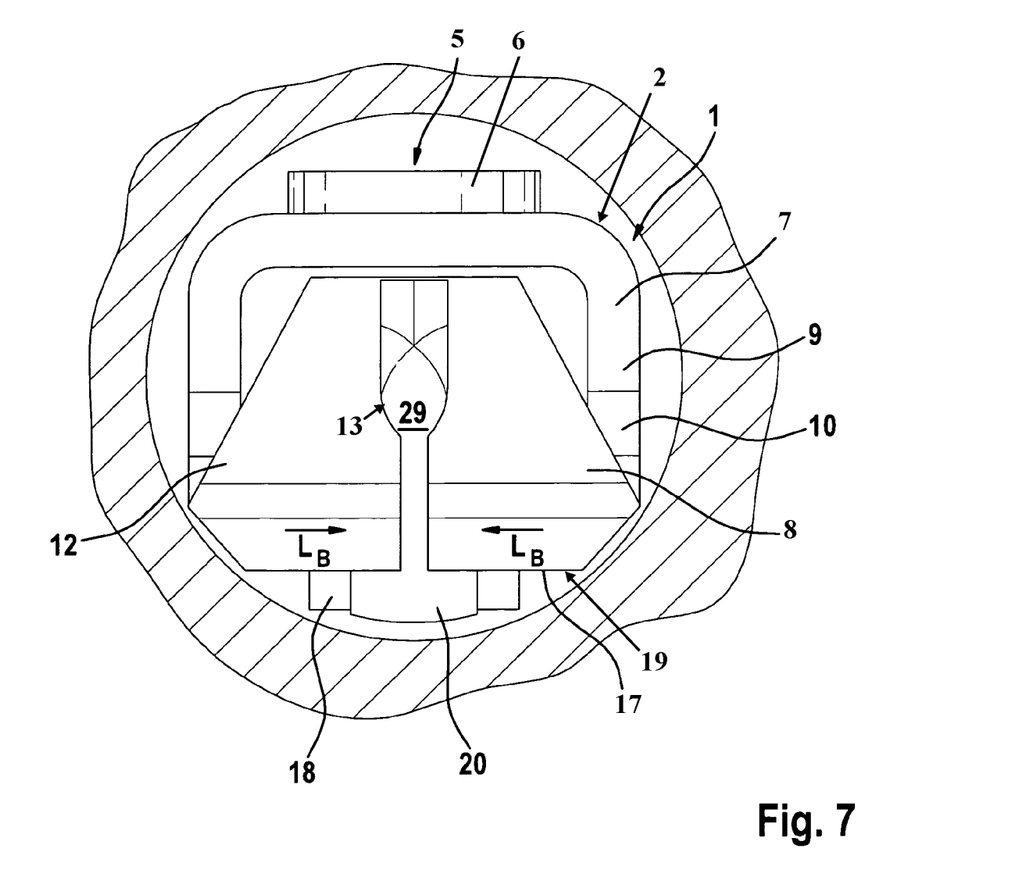
FIG. 7 shows the same exemplary embodiment, without the strip, in a view as in FIG. 2 during insertion of the crosspiece into a hole.

The use and functioning of the toggle fixing 1 is explained hereinbelow, especially with reference to FIGS. 6 and 7. To create a fixing arrangement 23, as shown in FIG. 6, in a first step a hole 25 is drilled in a thin-walled building component 24, in this case a plasterboard panel on a ceiling. The toggle fixing 1 is then pushed, front end first, through the hole 25. For easier insertion the toggle fixing 1 has, at its front end, two insertion slopes 26 on the contact body 8. The insertion slopes 26 have the effect that the two halves 12 are moved towards one another against the force of the resilient elements 15, as shown with reference to arrows B in FIG. 7. During insertion, the strip 3 is tilted in such a way that it runs parallel to the crosspiece longitudinal axis $L_1$, that is to say it rests against the crosspiece 2. As soon as the crosspiece 2 has passed fully through the hole 25, the resilient tongue 20 causes the crosspiece 2 to tilt relative to the strip 3. If the strip 3 is then pulled, the crosspiece 2 comes to rest against a rear side 27 of the thin-walled building component 24 remote from the user, as shown in FIG. 6. During this operation the strip 3 serves both for holding and for positioning and manipulating the crosspiece 2. By virtue of the resilient elements 15, the halves 12 of the contact body 8 move apart from one another again after passing through the hole 25. A sleeve having a collar can then be pulled along the strip 3 as far as the hole and the strip can be cut off at the sleeve (not shown), so that the position of the crosspiece 2 is fixed. Finally, an article (not shown) can be fixed in place by means of a screw (not shown), especially a metric screw, the screw being screwed into the threaded through-hole 6.

In the case of substantial loads, for example when fixing a heavy lamp, those loads are transmitted to the supporting body 7 via the screw and the threaded through-hole 6. As a result of its material- and shape-related rigidity, the supporting body 7 is able to distribute the arising forces over its entire length and transmit them to the contact body 8. Since the halves 12, after passing through the hole 25, have been moved apart from one another again and, in addition, have a large bearing surface 17, the load can be distributed over a large surface area on the rear side 27 of the thin-walled building component 24. This reduces the risk of breakout in comparison with known toggle fixings. It can nevertheless happen, however, that the thin-walled building component 24 sags, that is to say bulges, slightly. In order that this does not result in stress peaks in the region of the front and rear ends of the supporting body 7, the front and rear ends of the supporting edge 10 are each inclined with respect to the crosspiece longitudinal axis $L_1$ and in that region form a support surface 28 pointing obliquely outwards (FIG. 1).

When the toggle fixing 1 is used, for example, in the region of a ceiling, it can happen that, on drilling the hole 25, there is not a cavity behind the thin-walled building component 24, but, for example, a wooden lath as supporting structure for the thin-walled building component 24. In that case the crosspiece 2 cannot be tilted behind the thin-walled building component 24. The toggle fixing 1 can nevertheless be used for fixing. For that purpose the toggle fixing 1 is first inserted fully into the hole 25 and the strip 3 is cut off so that it no longer protrudes from the hole 25. The article to be fixed can then be put in place and a screw screwed through a drilled hole or the like in the article into the screw channel 13 of the toggle fixing 1. This corresponds to using the toggle fixing 1 similarly to an expansible fixing plug in a solid material. The screw channel 13 can also be interpreted as a slot 29 in the crosspiece 2. As a result of the screwing-in, the halves 12 are pressed apart from one another, so that the toggle fixing 1 expands in the hole 25. Because the screw channel 13 is somewhat narrower at the bottom than at the top, expansion can occur both laterally and towards the bottom. By virtue of the narrowing of the screw channel 13 from the rear to the front, the screw S (schematically shown in FIG. 5), having a diameter D2 that is greater than a diameter of the screw channel 13, can initially be easily screwed in, resulting in expansion which prevents co-rotation. When the screw passes into the narrower region of the screw channel 13, the turning moment is increased but the expansion also increases, so that good purchase is obtained. The teeth 16 likewise ensure good purchase in the hole 25. In particular, they are able to dig into a soft substrate.

Figure 8:
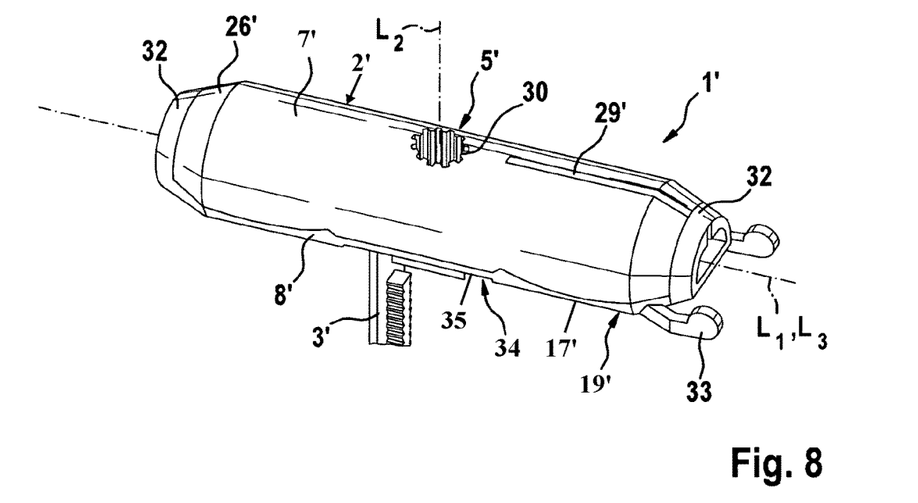
FIG. 8 shows a second exemplary embodiment in a perspective view.
Figure 9:
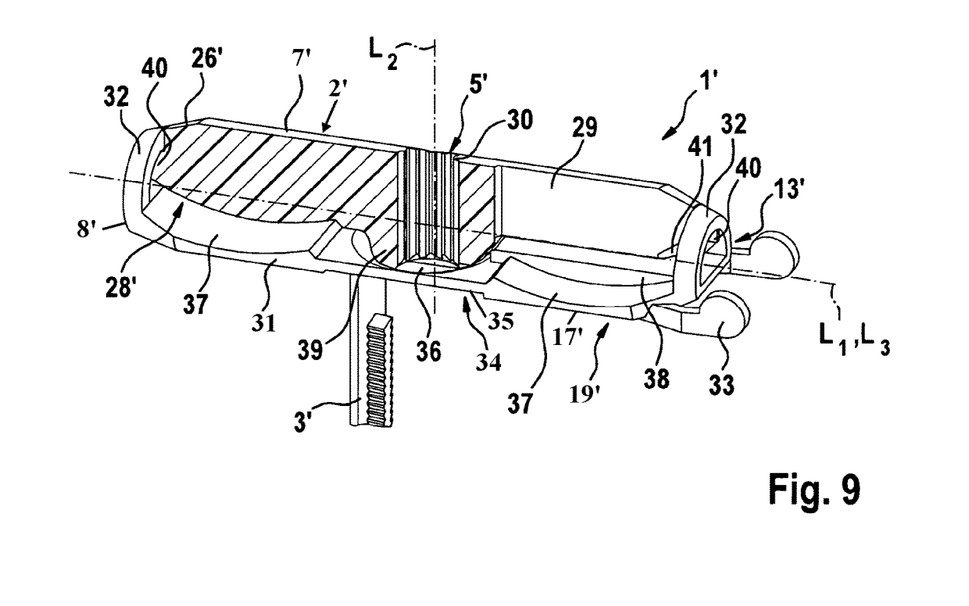
FIG. 9 shows the same exemplary embodiment in a perspective sectional view.

A toggle fixing 1' in accordance with a second exemplary embodiment is described below with reference to FIGS. 8 to 10. Analogous elements are denoted by corresponding reference numerals. To avoid repetitions, primarily the differences with respect to the first exemplary embodiment will be discussed. In the toggle fixing 1' of the second exemplary embodiment, both the contact body 8' and the supporting body 7' consist of plastics material, but in the case of the supporting body 7' the plastics material is a fibre-reinforced polyamide, while in the case of the contact body 8' it is a polyamide without fibre reinforcement, so that the supporting body 7' is again stronger and harder than the contact body 8'. The strip 3' is joined integrally with the contact body 8' and in the relaxed state projects perpendicularly to the crosspiece longitudinal axis $L_1$. On account of the resilience of the plastics material, in this case too the strip 3' can be tilted with respect to the crosspiece 2'. The crosspiece 2' has a cylindrical basic shape which, to form a bearing surface 17', has a planar flattened portion on a supporting side 19'. At the front and rear the crosspiece 2' has a truncated cone shape, so that at the front end an insertion slope 26' is formed. The opening 5' does not have a thread, but has ribs 30 distributed over the circumference and running in the direction of the opening longitudinal axis $L_2$, which ribs especially allow a self-tapping screw to be screwed in easily.

The contact body 8', which, like the supporting body 7', is mirror-symmetrical with respect to a plane parallel to the crosspiece longitudinal axis $L_1$ and to the opening longitudinal axis $L_2$, has a flat main body 31 which corresponds in width and length to the width and length, respectively, of the crosspiece 2'. The contact body 8' projects slightly beyond the supporting body 7' in respect of length and width. An arch 32 projects upwards from the contact body 8' at its front and rear ends. In addition, at the rear, two rounded tabs 33 project in the direction of the crosspiece longitudinal axis $L_1$. On the lower side, the contact body 8' forms a substantially planar bearing surface 17', the bearing surface 17' running slightly obliquely upwards at the front and rear. In the centre, over approximately 30 percent of the length of the crosspiece 2', the bearing surface 17' has a recess 34 in the form of a shallow groove-like setback 35. In the region of the recess 34 there is also arranged a circular aperture 36 which is aligned coaxially with respect to the opening longitudinal axis $L_2$. On the upper side of the contact body 8', to the front and rear of the aperture 36 there are arranged arcuate bearing portions 37 which are elongate in the direction of the crosspiece longitudinal axis $L_1$ and extend as far as the arches 32. While the front bearing portion 37 is formed so as to be continuous transversely with respect to the crosspiece longitudinal axis $L_1$, the rear bearing portion 37 is traversed by an upwardly projecting bar-like bridge 38 which extends from the aperture 36 as far as the rear arch 32.

The supporting body 7' is shaped on its lower side so as to be substantially complementary to the upper side of the contact body 8' and rests against the latter so that the supporting body 7' and the contact body 8' together form a substantially solid crosspiece 2. As a result of its arcuate construction on the lower side, the supporting body 7' forms support faces 28' which face obliquely outwards at the front and rear. The supporting body 7' has a collar 39 which lengthens the opening 5' towards the bottom along the opening longitudinal axis $L_2$ and projects through the aperture 36, so that it projects beyond the contact body 8' towards the bottom. At the front and rear the supporting body 7' has respective extension pieces 40 which engage in the arches 32, with the result that the contact body 8' is held by the supporting body 7'. At the location where the bridge 38 is arranged in the contact body 8', a slot 29' extends over the entire height over the length of the bridge 38 in the supporting body 7'. A short centring opening 41 leads into the slot 29' from the rear.

Figure 10:
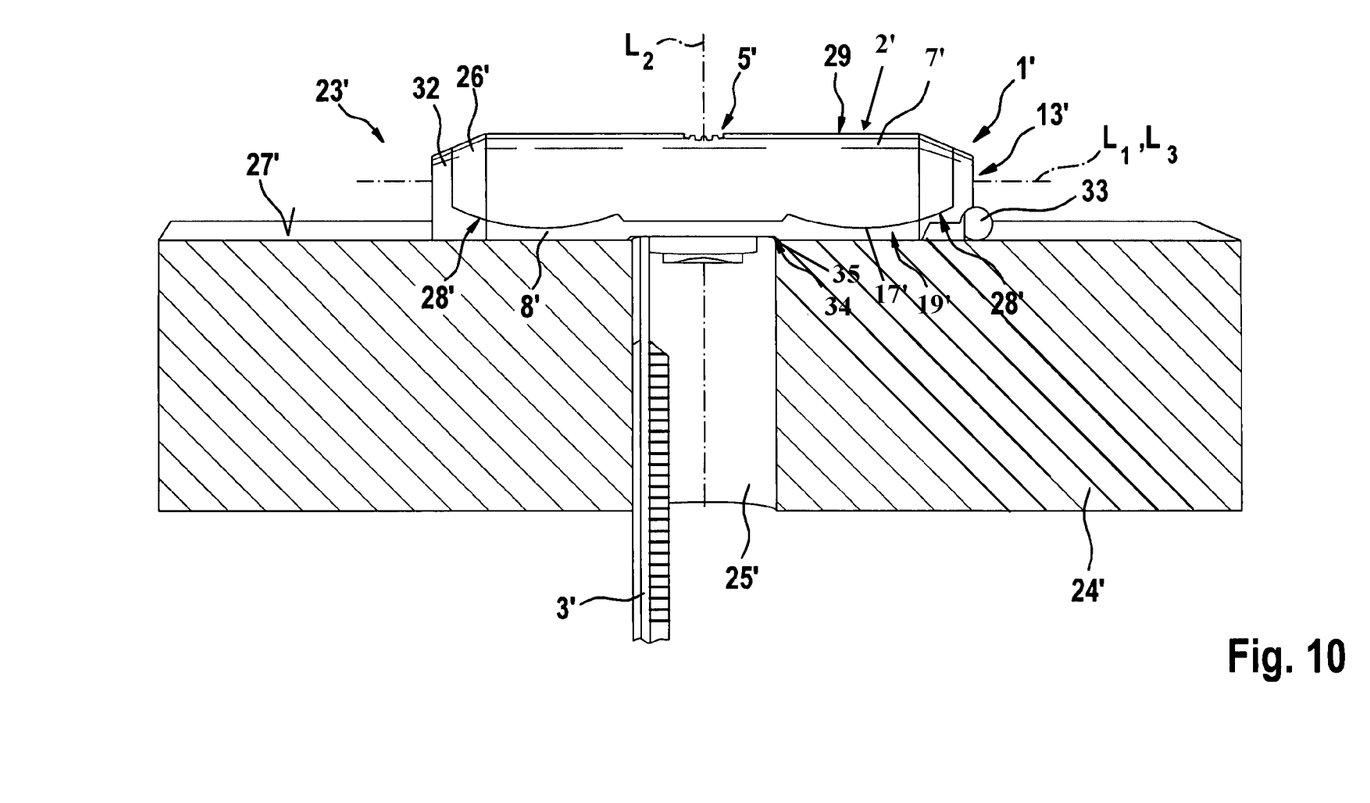
FIG. 10 shows the same exemplary embodiment during mounting on a thin-walled building component in a sectional view.

If the toggle fixing 1' as shown in FIG. 10 is used in a thin-walled building component 24' having a cavity on the rear side 27', the mounting operation corresponds to the first exemplary embodiment. The tabs 33 serve for better tilting of the crosspiece 2' on the rear side 27'. Since the collar 39 protrudes, it projects into the hole 25' in the thin-walled building component 24' and is able to transmit forces acting transversely with respect to the opening longitudinal axis $L_2$ from the crosspiece 2' directly to the thin-walled building component 24'.

If the toggle fixing 1' as described above for the first exemplary embodiment is used similarly to an expansible fixing plug in a solid building material, the screw passes through the centring opening 41 into the slot 29', which acts as screw channel 13'. The contact body 8' is thereby pressed towards the bottom and expands the supporting body 7'. The screw can optionally be driven self-tappingly beyond the slot 29' into the crosspiece 2'.

LIST OF REFERENCE SYMBOLS 1, 1' Toggle fixing
1, 1' toggle fixing
2, 2' crosspiece
3, 3' strip
4 bearing pin
5, 5' opening
6 threaded through-hole
7, 7' supporting body
8, 8' contact body
9 limb of the supporting body 7
10 supporting edge of the supporting body 7
11 bulge of the limbs 9
12 half of the contact body 8
13, 13' screw channel
14 resilient bridge
15 resilient element
16 tooth
17, 17' bearing surface
18 point
19, 19' supporting side
20 resilient tongue
21 locking lug
22 aperture
23, 23' fixing arrangement
24, 24' thin-walled building component
25, 25' hole
26, 26' insertion slope
27, 27' rear side of the thin-walled building component 24, 24'
28, 28' support surface
29, 29' slot
30 ribs
31 main body of the contact body 6'
32 arch
33 tab
34 recess
35 setback
36 aperture
37 bearing portion
38 bridge
39 collar
40 extension piece
41 centring opening
$L_1$ crosspiece longitudinal axis
$L_2$ opening longitudinal axis
$L_3$ channel longitudinal axis

The invention claimed is:

1. A toggle fixing for fixing an article to a thin-walled building component, having a crosspiece which extends along a crosspiece longitudinal axis and has an opening for receiving a screw, the opening extending along an opening longitudinal axis transversely with respect to the crosspiece longitudinal axis, and having a strip which is connected to the crosspiece and serves for holding and positioning the crosspiece during mounting, the crosspiece forming a supporting side on the side facing towards the strip, wherein the crosspiece has a screw channel which extends along a channel longitudinal axis which is substantially parallel to the crosspiece longitudinal axis, wherein the screw channel is formed by at least two parts of the crosspiece, wherein the two parts have connected ends that are connected to each other by at least one resilient element arranged at an axial end of the screw channel, wherein the two parts are configured to move relative to one another in a direction transverse with respect to the crosspiece longitudinal axis in response to a screw being received in the screw channel.

2. The toggle fixing according to claim 1, wherein the screw channel extends over at least a fifth of the longitudinal extent of the crosspiece.

3. The toggle fixing according to claim 2, wherein the screw channel extends over at least a third of the longitudinal extent of the crosspiece.

4. The toggle fixing according to claim 1, wherein the screw channel extends over the entire length of the crosspiece.

5. The toggle fixing according to claim 1, wherein the screw channel narrows in one direction.

6. The toggle fixing according to claim 1, wherein the crosspiece has a slot which runs substantially parallel to the crosspiece longitudinal axis.

7. The toggle fixing according to claim 1, wherein a first component of the crosspiece forms a supporting body and a second component forms a contact body in the region of the supporting side for planar contact with a thin-walled building component.

8. The toggle fixing according to claim 7, wherein the first component is harder than the second component.

9. The toggle fixing according to claim 7, wherein the screw channel is formed at least partly by the contact body.

10. The toggle fixing according to claim 7, wherein the screw channel is arranged between the contact body and the supporting body.

11. The toggle fixing according to claim 7, wherein the contact body, at least in two outer thirds of the longitudinal extent of the crosspiece, projects beyond the supporting body on the supporting side in the direction of the opening longitudinal axis.

12. The toggle fixing according to claim 7, wherein the contact body comprises the at least two parts.

13. The toggle fixing according to claim 12, wherein the parts are connected to one another by way of the resilient element.

14. The toggle fixing according to claim 12, wherein the contact body parts consist of two halves.

15. The toggle fixing according to claim 14 wherein the two halves are movable relative to one another in a direction transverse with respect to the crosspiece longitudinal axis.

16. The toggle fixing according to claim 14, wherein the two halves are connected to one another by way of the resilient element.

17. The toggle fixing according to claim 16, wherein the two halves are integrally connected to one another.

18. The toggle fixing according to claim 7, wherein the supporting body has, at least in some regions, a U-shaped cross-section.

19. The toggle fixing according to claim 1, wherein at least one end of the crosspiece has an insertion slope.

20. A toggle fixing for fixing an article to a thin-walled building component, having a crosspiece which extends along a crosspiece longitudinal axis and has a screw opening, the opening extending along an opening longitudinal axis transversely with respect to the crosspiece longitudinal axis, and having a strip which is connected to the crosspiece and serves for holding and positioning the crosspiece during mounting, the crosspiece forming a supporting side on the side facing towards the strip, wherein the crosspiece has a screw channel which extends along a channel longitudinal axis which is substantially parallel to the crosspiece longitudinal axis, wherein the toggle fixing includes a screw having a diameter that is greater than a diameter of the screw channel, and wherein the screw channel is formed by at least two parts of the crosspiece that are connected to each other and configured to move relative to one another in a direction transverse with respect to the crosspiece longitudinal axis in response to the screw being received in the screw channel.

* * * * *